United States Patent
Breault

(10) Patent No.: US 10,919,752 B2
(45) Date of Patent: Feb. 16, 2021

(54) REFRIGERATOR WITH CARBONATED DRINK SPOUT

(71) Applicant: Michael John Breault, Redlands, CA (US)

(72) Inventor: Michael John Breault, Redlands, CA (US)

( * ) Notice: Subject to any disclaimer, the term of this patent is extended or adjusted under 35 U.S.C. 154(b) by 0 days.

(21) Appl. No.: 16/506,669

(22) Filed: Jul. 9, 2019

(65) Prior Publication Data

US 2019/0330045 A1    Oct. 31, 2019

Related U.S. Application Data

(63) Continuation-in-part of application No. 14/134,309, filed on Dec. 19, 2013.

(60) Provisional application No. 62/696,648, filed on Jul. 11, 2018, provisional application No. 61/739,466, filed on Dec. 19, 2012.

(51) Int. Cl.
| | |
|---|---|
| *B67D 1/00* | (2006.01) |
| *A23L 2/54* | (2006.01) |
| *A23L 2/60* | (2006.01) |
| *F25D 23/12* | (2006.01) |

(52) U.S. Cl.
CPC .............. *B67D 1/0057* (2013.01); *A23L 2/54* (2013.01); *A23L 2/60* (2013.01); *F25D 23/126* (2013.01); *F25D 2400/22* (2013.01); *F25D 2400/36* (2013.01); *F25D 2700/08* (2013.01)

(58) Field of Classification Search
CPC .... B67D 1/0057; B67D 1/124; B67D 1/0078; B67D 1/0058; B67D 1/0021; B67D 2210/00036; F25D 23/126; F25D 2400/22; F25D 2700/08; F25D 2400/36; A23L 2/60; A23L 2/54
USPC ............................................... 222/325, 146.6
See application file for complete search history.

(56) References Cited

U.S. PATENT DOCUMENTS

| | | | |
|---|---|---|---|
| 4,008,832 A | | 2/1977 | Rodth |
| 4,306,667 A | | 12/1981 | Sedam et al. |
| 4,343,824 A | * | 8/1982 | Caldwell .................. A23L 2/54 |
| | | | 426/477 |
| 4,676,401 A | | 6/1987 | Fox et al. |
| 5,097,989 A | | 3/1992 | Nakayama et al. |
| 6,536,626 B2 | | 3/2003 | Newman |
| 6,751,525 B1 | | 6/2004 | Crisp, III |
| 6,986,263 B2 | | 1/2006 | Crisp, III |
| 7,032,780 B2 | | 4/2006 | Crisp, III |
| 8,290,616 B2 | * | 10/2012 | Crisp, III ............. B67D 1/0057 |
| | | | 700/236 |

(Continued)

*Primary Examiner* — Donnell A Long
(74) *Attorney, Agent, or Firm* — Kirk A. Buhler; Buhler & Associates Patenting

(57) ABSTRACT

Improvements to a refrigerator with carbonated drink spout that provides a drink at the exterior of the door of the refrigerator. The improvement allows people with different tastes to select a flavor syrup cartridge, insert the flavor syrup in a external port in the door of the refrigerator and dispense the beverage using fluids that are chilled by the refrigerator. It frees the interior space of the refrigerator that is used to store cold flavored water and carbonated beverages. The refrigerator includes an internal CO2 tank and separate reservoirs of refrigerated flat and refrigerated carbonated water. The delivery system is flushed with each use to eliminate cross contamination of flavors or syrups.

18 Claims, 4 Drawing Sheets

(56) References Cited

U.S. PATENT DOCUMENTS

| | | | | |
|---|---|---|---|---|
| 2004/0211210 A1* | 10/2004 | Crisp, III | ............ | G06Q 10/087 62/389 |
| 2006/0006107 A1* | 1/2006 | Olson | .................. | B67D 1/0004 210/198.1 |
| 2010/0139496 A1* | 6/2010 | Santoiemmo | ........ | B67D 1/0888 99/323.2 |
| 2012/0104024 A1* | 5/2012 | Anselmino | .......... | B67D 1/0857 222/1 |
| 2014/0263416 A1* | 9/2014 | Green | ................. | B67D 1/0021 222/1 |
| 2015/0135965 A1* | 5/2015 | Lo Foro | .............. | A47J 31/3633 99/285 |
| 2015/0353335 A1* | 12/2015 | Breault | ................ | B67D 1/0021 222/129.1 |
| 2018/0352836 A1* | 12/2018 | Cronin | .................. | F25D 23/126 |

\* cited by examiner

REFRIGERATOR WITH CARBONATED DRINK SPOUT

CROSS REFERENCE TO RELATED APPLICATIONS

This application claims the benefit of Provisional Application Ser. No. 62/696,648 filed Jul. 11, 2018, is a continuation-in-part of applicant's co-pending application Ser. No. 14/134,309 filed Dec. 19, 2013 which claims the benefit of Provisional Application Ser. No. 61/739,466 filed Dec. 19, 2012 and international application PCT/US13/76518 which was filed on Dec. 19, 2013 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a refrigerator. More particularly, the present refrigerator with carbonated drink spout allows a user to create a desired carbonated or non-carbonated drink using the water from the refrigerator directly at the door of the refrigerator.

Description of Related Art Including Information Disclosed Under 37 CFR 1.97 and 1.98

Refrigerators have advanced over the years from boxes with blocks of ice that are used to cool the interior contents to refrigerators that cool themselves to modern refrigerators that dispense water and ice at the door. Some more modern refrigerators can dispense more than water and can include carbonation, and internal syrups that can be mixed with water that is being dispensed.

A number of patents and or publications have been made to address these issues. Exemplary examples of patents and or publication that try to address this/these problem(s) are identified and discussed below.

U.S. Pat. No. 6,751,525 was issued on Jun. 15, 2004, U.S. Pat. No. 6,986,263 was issued on Jan. 17, 2006 and U.S. Pat. No. 7,032,780 was issued on Apr. 25, 2006 all three to Harry Lee Crisp III are for a beverage distribution and dispensing system and method. These patents disclose a refrigerator having a beverage dispenser, a display device and a plurality of beverage data files. The refrigerator dispenses beverages such as soda, juice and punch. The refrigerator receives and stores beverage data files, and the display device graphically represents data related to the different types of available beverages. Based on this information, the user can select a desirable beverage, and the refrigerator dispenses the selected beverage. The patents are for a system with internal syrups and the user is limited to the internal syrups.

U.S. Pat. No. 6,536,626 was issued on Mar. 25, 2003, to David R. Newman et al., and is titled Self-monitoring, intelligent dispenser. This patent discloses an intelligent fountain dispenser performs automated control and systems diagnostics in real time. The intelligent fountain dispenser includes a controller in electrical communication with a syrup valve, a water valve, a carbonator valve, a water level sensor, a flowmeter, and an input panel. The intelligent fountain dispenser also includes a dispenser housing and a carbonator tank. Water and carbon dioxide mix in the carbonator tank to produce carbonated water. The carbonator valve supplies water to the carbonator tank in accordance with instructions received from the controller. The controller also instructs the syrup valve and the water valve in the supply of syrup and carbonated water, respectively, to the dispenser housing.

What is needed is a refrigerator with carbonated drink spout where a user can insert a syrup cartridge into the door of the refrigerator to make the desired drink. The proposed refrigerator with carbonated drink spout provides the solution and allows the user to select any of a variety of syrups without limiting the selection to the syrup within the refrigerator.

BRIEF SUMMARY OF THE INVENTION

It is an object of the refrigerator with carbonated drink spout to provide a drink at the exterior of the door of the refrigerator. This provides a solution to allow a large number of people with different tastes to select any flavor syrup cartridge without limitation to a limited number of internal syrup flavors. It further eliminates the counterspace and storage of the beverage dispenser. It also frees the interior space of the refrigerator that is used to store cold flavored water and carbonated beverages. Because most modern refrigerators include cold water the additional function of dispensing flavored beverages is the next novel step in refrigerator delivery systems. A consumer can also dispense ice into a bottle or glass to extend the period of time the beverage is cold.

It is an object of the refrigerator with carbonated drink spout to provide an option for carbonated water or for delivery of flat water. This option for the water type gives a consumer the ability to quickly change the type of water that is being dispensed or dispensed with the syrup. A consumer may also be able to alter the amount of flat and carbonated water if they prefer a flatter carbonated drink. Within the refrigerator is a CO2 tank that is replaceable from within the refrigerator or from a front or side access door.

It is another object of the refrigerator with carbonated drink spout to include a port on the exterior of the door to insert a syrup dispenser. Placing the port on the exterior of the door allows a consumer to simply insert the desired syrup, select the type of water and begin the dispensing process. The syrups can be maintained within the refrigerator or can be stored at room temperature. The water that is added to the syrup when it is mixed and dispensed is cold to minimize flavor dilution when ice melts. The syrup path into the refrigerator and to the dispenser is flushed with each use to eliminate cross-contamination of fluids that can alter the taste/flavor of the dispensed beverage.

It is still another object of the refrigerator with carbonated drink spout to include reservoirs for water and carbonated water. The two separate reservoirs are maintained at an optimal temperature and because two separate reservoirs are used the amount of cold fluid that is stored within the refrigerator is increased. Maintaining to separate reservoirs also reduces the time required to dispense the beverage and eliminated cross-contamination of the water to provide optimal flavor.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
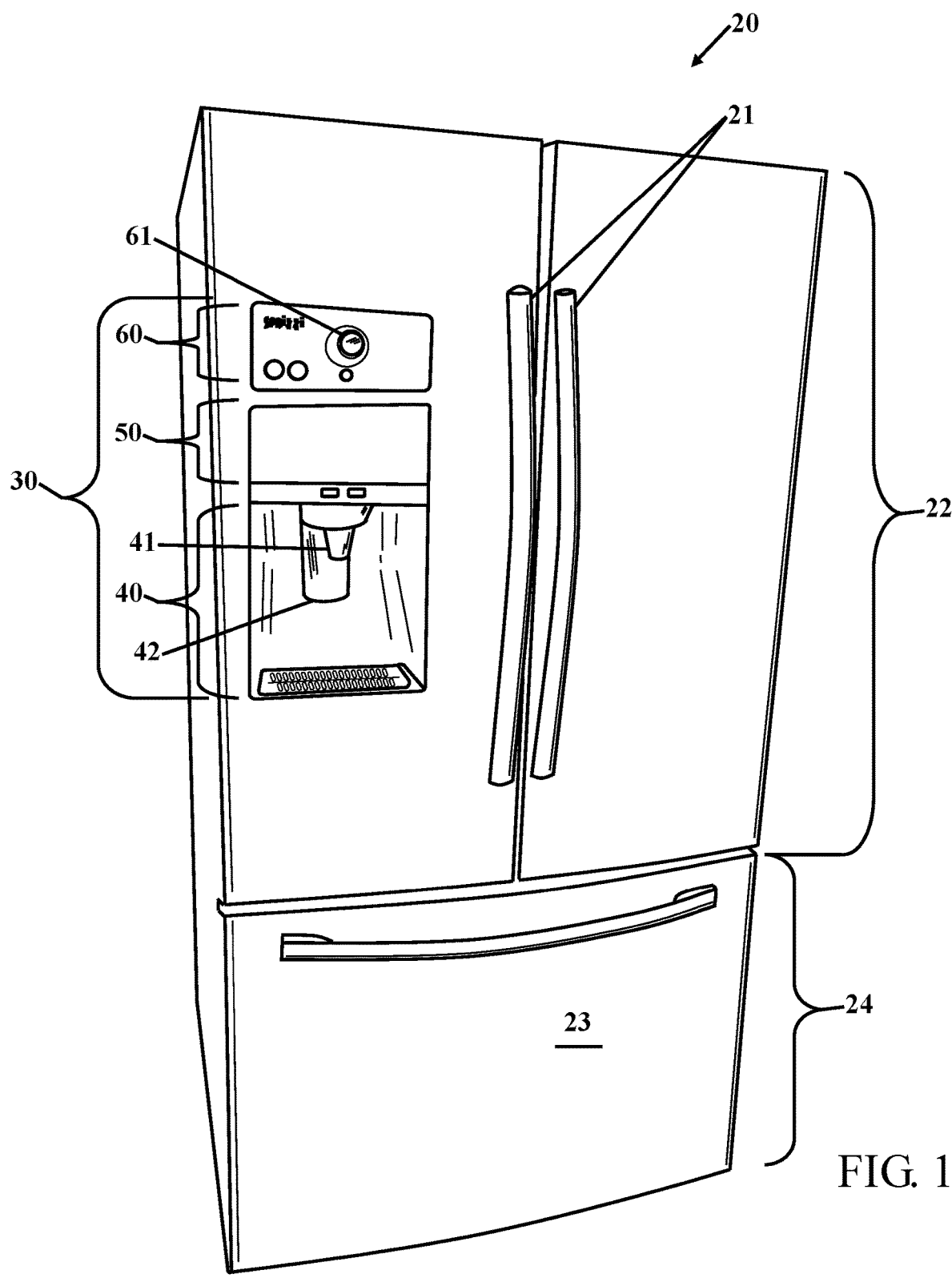
FIG. 1 shows a perspective view of a refrigerator with carbonated drink spout.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention but is merely representative of various embodiments of the invention. The illustrated embodiments of the invention will be best understood by reference to the drawings, wherein like parts are designated by like numerals throughout.

ITEM NUMBERS AND DESCRIPTION 20 refrigerator
21 handles
22 refrigerator portion
23 freezer door
24 freezer section
30 at the door functions
31 inserted
32 select
33 removed
40 dispenser
41 drink spout
42 lever
43 drain/overflow
44 glass or container
45 flow
50 ice/water functions
51 refrigerator function display
52 water
53 cube/crushed
60 drink control section
61 syrup port
62 Start
63 Flat/Carbonated
64 power-on
65 threads
66 display
70 syrup bullet
71 seal
72 syrup bullet dispensing
73 syrup bullet empty
80 main logic PCB processor
81 power supply
82 water supply
83 water filter
84 solenoid valve
85 2.5 liter flat water tank
86 1.5 liter carbonated water tank
87 pump
88 pump
89 solenoid valve
90 solenoid valve
91 12 Oz CO2 tank
92 pressure regulator
93 solenoid valve
94 manifold
95 bullet reader
96 communications system
100 front control PCB
101 self-clean
102 timeout
103 syrup injector
104 LED display(s)
105 switches FIG. 1 shows a perspective view of a refrigerator 20 with carbonated drink spout 41. The drink spout is preferably a Brixing diffuser and nozzle. This figure provides an overview of the refrigerator with carbonated drink spout and the details of the features and functions will be shown and described in other figures herein. The refrigerator 20 has the refrigerator 22 in the upper portion with a pair of doors with handles 21. The lower portion of the refrigerator 20 is a freezer 23. While this particular arrangement is shown and described with the refrigerator above the freezer and two doors in the refrigerator section, the refrigerator 20 can take any contemplated configuration of refrigerator/freezer and number of doors.

The basic refrigerator 20 essentially is a refrigerator with a water and ice dispenser 40. The controls for the water and ice dispenser are in the middle control area 50 that allows the dispensing of water, ice cubes or crushed ice. While these are typical features their inclusion or exclusion does not limit the feature or function of the dispenser disclosed herein. The dispensing and delivery of water or ice is generally controlled with a lever 42 wherein pushing a glass or other container into the lever 42 will start the flow of water, cubed ice or crushed ice to fall or flow into the glass or container. The addition of the carbonated drink spout 41 requires proper blending of flavored syrup with water or carbonated water. This is accomplished through the drink spout 41.

This drink spout 41 is similar to a dispenser found in carbonated drink dispensers. The refrigerator 20 with carbonated drink spout 41 requires an additional drink control section 60 and input port 61 where a user selectable cartridge of syrup is inserted for mixing with carbonated or still water. With this basic over view of refrigerator 20 with carbonated drink spout 41 a more detailed description of the features and functions will be disclosed.

Figure 2:
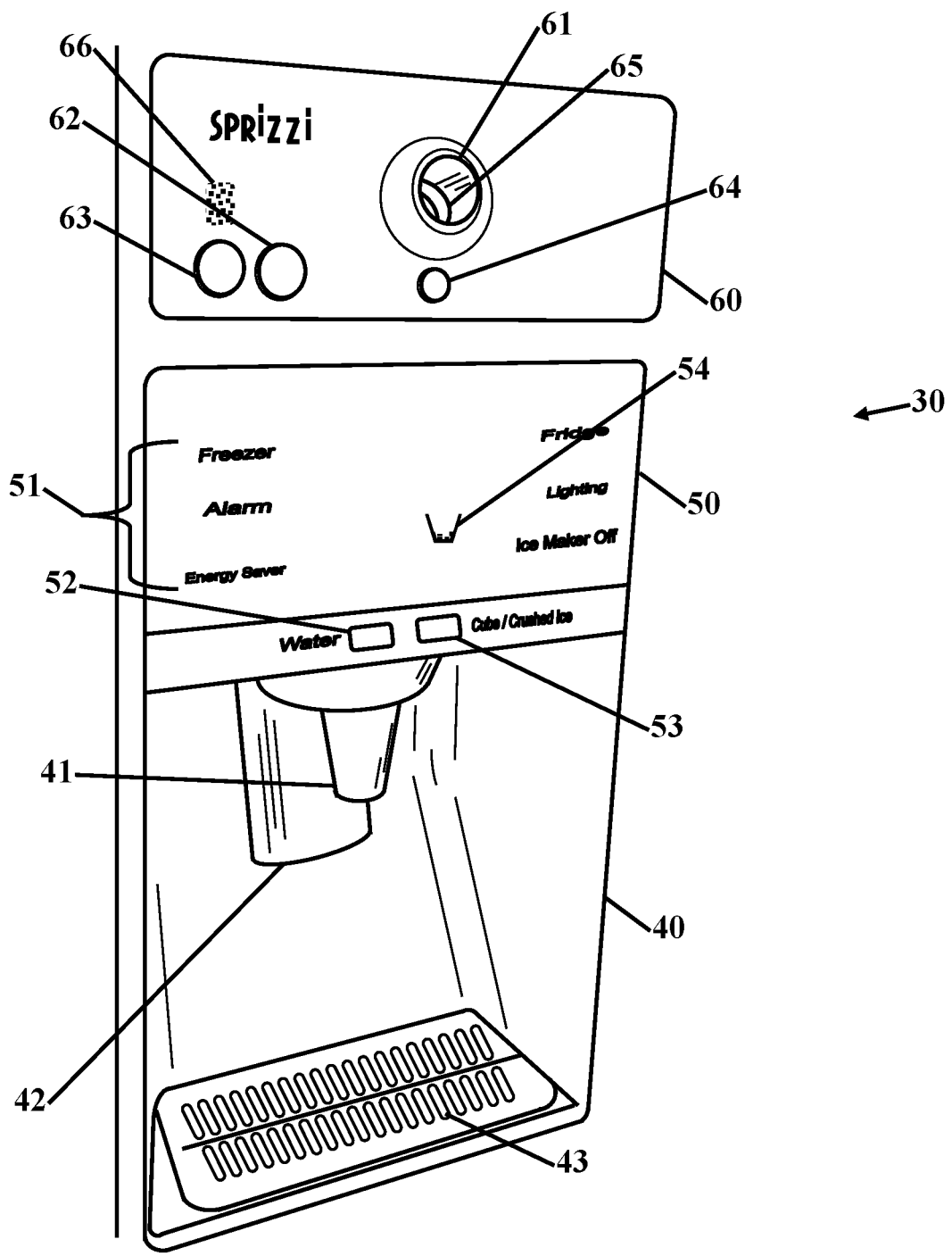
FIG. 2 shows a detail view of the syrup port and the dispenser.

FIG. 2 shows a detail view of the syrup port 61 and the dispenser at the door functions 30. Most of the functions on the bottom of the door functions are similar to refrigerators having water and ice functions on the door. In the middle portion of the figure are the ice/water functions, the water button 52 sets the normal water dispensing function. The ice type button 53 toggles the display 54 from showing crushed ice or cubes. The refrigerator function display area 51 includes, but is not limited to the freezer, alarm, energy saver, fridge, lighting and ice maker on/off. The dispenser portion 40 has a lever 42 that controls the delivery of ice or water based upon the selection of buttons 52 and 53. The drink spout 41 is controlled by the drink control section 60.

The drink control section 60 includes additional novel features in a refrigerator. A syrup port 61 is where a syrup cartridge or bullet is threaded 65 into the port. A power-on button 64, will turn-on the drink dispensing section. The drink dispenser will turn itself off after a period of time of usually about 10 minutes, but this time can be variable or adjustable to less than 10 minutes or more than 10 minutes. It is also contemplated that insertion of a syrup cartridge or bullet can turn-on the drink dispensing section. A display 66 will show that the drink dispenser is active and the display can show the water type that will be dispensed as flat or carbonated. Button 63 allows toggling between flat and carbonated water. A button 62 will start the dispensing of a mixture of the water and the syrup out of the drink spout 41.

Figure 3A:
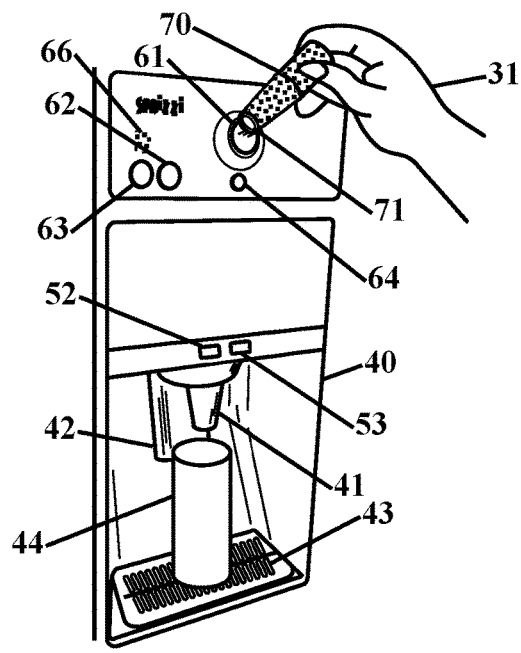
FIG. 3A-3D shows the sequence of events to use a refrigerator with carbonated drink spout.

FIG. 3A-3D shows the sequence of events to use a refrigerator with carbonated drink spout. In FIG. 3A the user inserts a syrup cartridge or bullet 70 into the syrup port 61. The syrup cartridge or bullet 70 has a seal 71 and is thread or inserted 31 into the port. The seal 71 is broken as the syrup cartridge or bullet 70 is seated into the syrup port 61. The user will then either press the power button 64 or the system will recognize that a syrup cartridge or bullet 70 has been inserted and will power the display for the drink dispenser. The consumer can press the water type button 63 to toggle between flat and carbonated water. The display 66 will show the water type that the user wants mixed with the syrup cartridge or bullet 70.

Each flavor bullet 70 can have a unique identifier. The unique identifier can be a bar code, serial number, RFID or other equivalent mechanism or label. The unique identifier provides two functions. First, it is used by the dispensing mechanism to determine the amount of syrup, carbonation and water to blend with the flavor bullet 70. The second function is to identify where the specific flavor bullet 70 was purchased or taken. When the flavor bullet 70 is inserted into a dispenser the flavor bullet 70 is scanned and the unique ID allows for proper crediting or charging of the person or account as inventory management. In this example, if a person removes a flavor bullet from a club and uses the flavor bullet 70 at home, the club is credited for the flavor bullet.

Figure 3B:
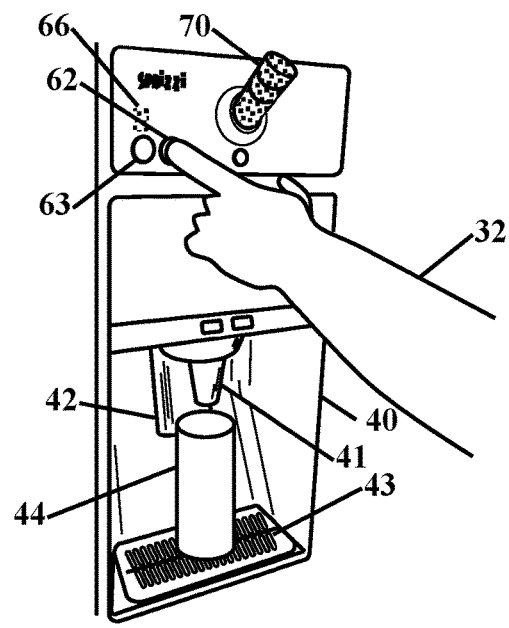

From FIG. 3B the syrup cartridge or bullet 70 is fully inserted and screwed into the syrup port 61, the water type is selected by the user 32 and the user presses the start button 62. In this embodiment the entire contents of the syrup cartridge or bullet 70 is dispensed, but it is contemplated that the user could hold the start button 62 to dispense only a portion of the fluid in the syrup cartridge or bullet 70 or the user can select the amount of number of ounces or milliliters that with be dispensed.

Figure 3C:
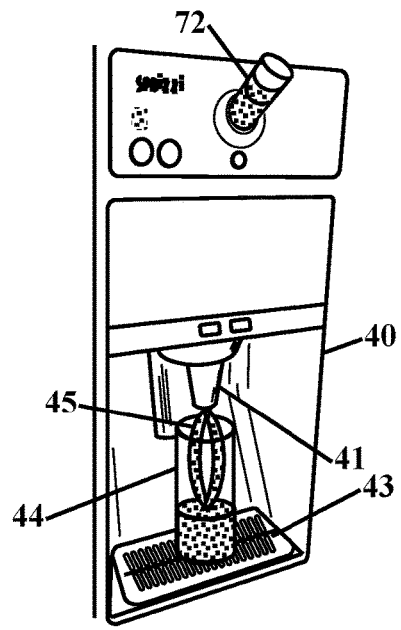
Figure 3D:
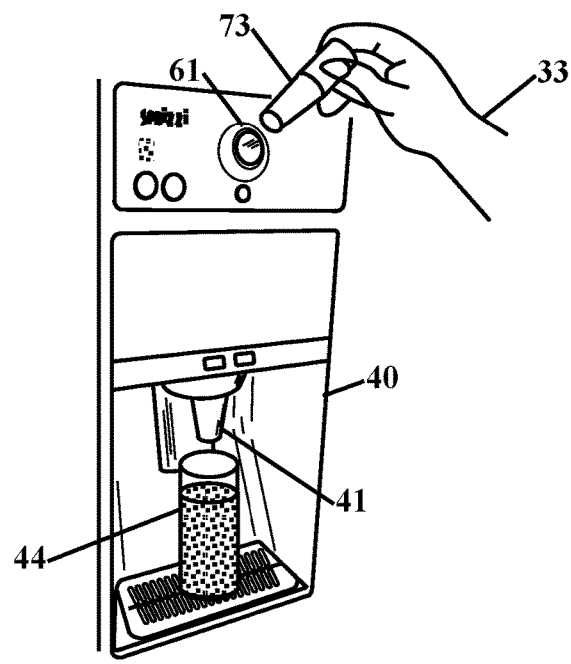

In FIG. 3C the syrup from the syrup cartridge or bullet 72 is being mixed with the desired type of water and is shown being dispensed in the glass or container from the drink spout 41 or Brixing diffuser and nozzle. In this embodiment the dispensing will continue until the syrup cartridge or bullet 72 is empty as shown in FIG. 3D. In FIG. 3D the syrup cartridge or bullet 73 is extinguished and is being removed 33. The glass or container 44 is filled with the dispensed mixture and is ready for consumption. The consumer can use the refrigerator functions to add additional water or ice to the drink.

Figure 4:
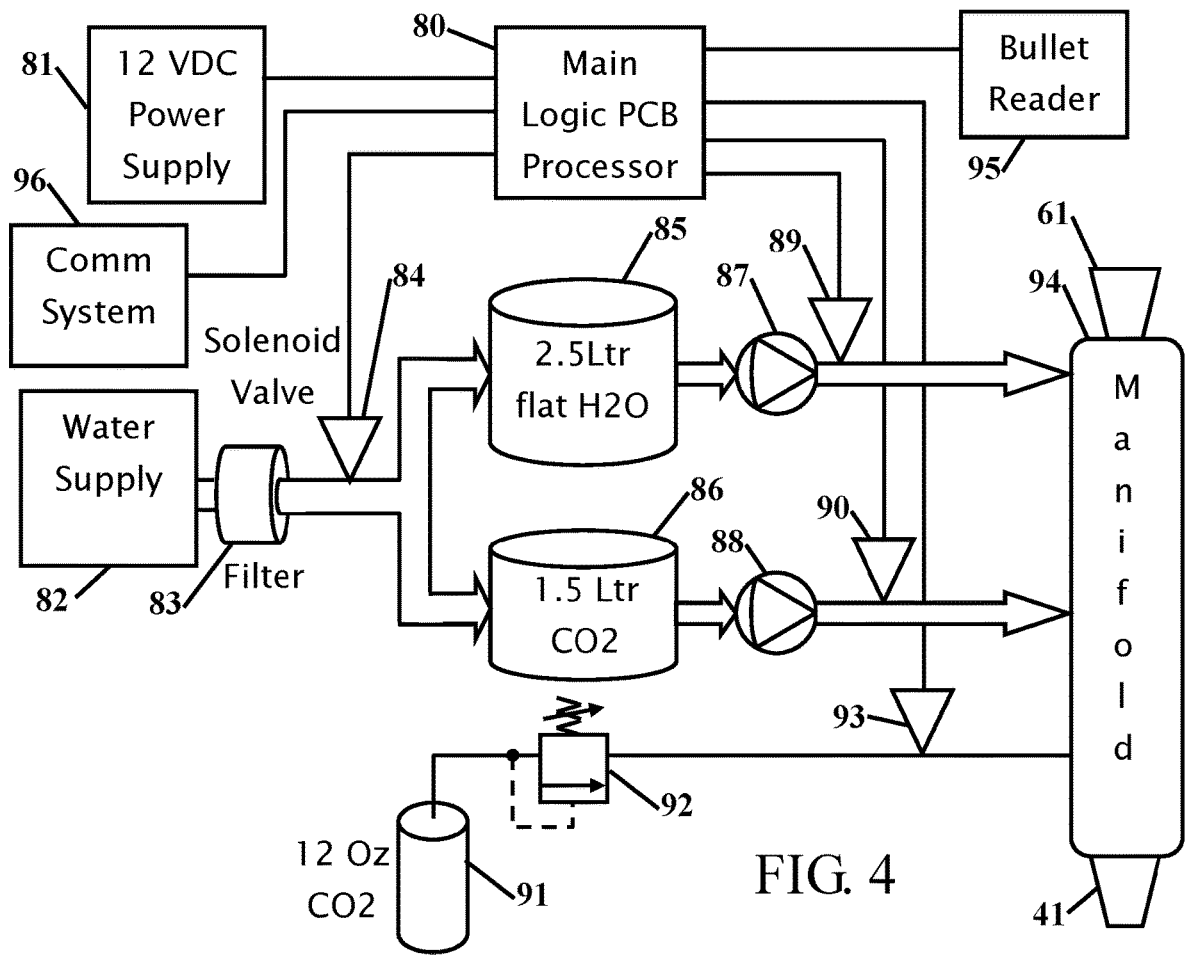
FIG. 4 shows the back-end components.

FIG. 4 shows the back-end components. The main logic PCB processor controls the operation of the supply of water 82 to the dispensing out of the drink spout 41. Incoming voltage/power is regulated 81 to 12 VCD and then may be supplied to other regulators to the main logic PCB 80. The water supply 82 enters the refrigerator and is passed through a filter 83. A solenoid valve 84 controls the flow from the fresh water supply 82. The filtered water fills a 2.5-liter flat water reservoir 85 and a 1.5-liter CO2 reservoir 86. While particular volumes of reservoirs are indicated, other volume can be used. Separate diaphragm pumps 87 and 88 pump water from the flat and carbonated water tanks 85 and 86 respectively. In addition to the diaphragm pumps 87 and 88, dispensing solenoids 89 and 90 further control 91 the flow of water from the flat and carbonated water tanks 85 and 86 respectively. The reservoirs 85 and 86 are cooled to provide a supply of cooled waters to the dispensing drink spout 41.

This figure also shows a bullet reader 95 that reads the unique identifier can be a bar code, serial number, RFID or other equivalent mechanism or label of each flavor bullet. The unique ID is communicated to the main logic PCB processor 80 to determine the mixing recipe and also sends the unique identifier to a communications system 96 for accounting. The communications system can be wired or wireless and connects to a network that supports the system.

This figure further shows a 12 CO2 cartridge 91. In the preferred embodiment the CO2 cartridge is a 12-ounce volume, but other volumes are contemplated. A regulator 92 controls the pressure from the CO2 bottle or tank 91. A CO2 solenoid 93 controls the flow of CO2 gas to a mixing manifold 94 ounce. The fluids from the syrup port 61, flat water reservoir 85, carbonated water reservoir 86 and the CO2 tank 91 is mixed in the manifold 94 to dispense the mix fluids that exit the drink spout 41 or Brixing diffuser and nozzle.

Figure 5:
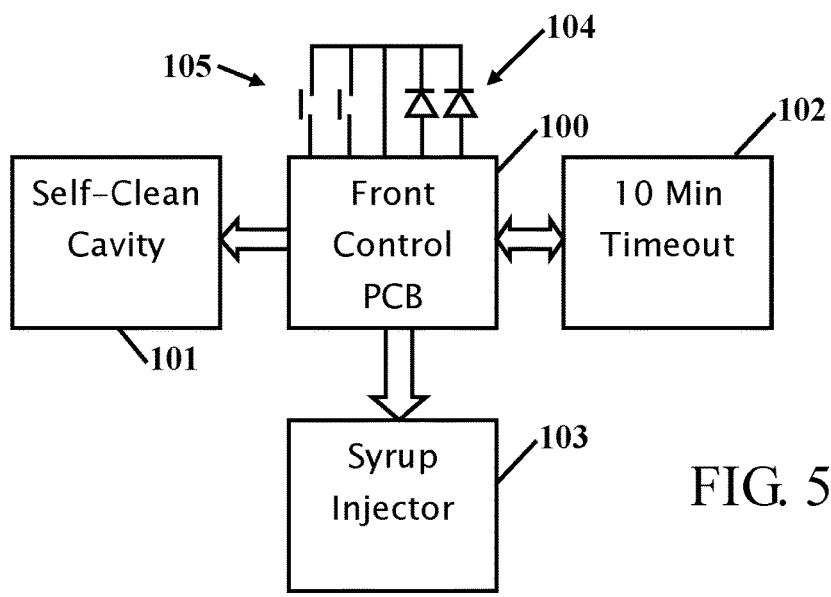
FIG. 5 shows the front-end components.

FIG. 5 shows the front-end components. The front-end components are essentially all of the controls and user interface that the user sees and touches to interact with the refrigerator with carbonated drink spout. The front control PCB 100 controls a number of display LED's 104 and monitors input from the user as they press mechanical or capacitive buttons 105 and level sensors. The LED's can display the status of reservoir levels for the CO2 tank and water temperature. The sensors can also monitor the drain/overflow 43 (shown in other figures) of the drip tray and can stop additional flow of fluids if an overflow condition is detected. The sensors also determine the presence of a syrup cartridge or bullet in the syrup port 61 and control a syrup injector with micro function accu-pour detection. The front control PCB 100 further monitors and controls the single serve auto pour technology. The on-off switch 64 (shown in other figures) can include a 10-minute sleep mode feature. The front-end control PCB 100 further controls a self-cleaning and self-detecting syrup flavor bullet cavity to ensure that syrup is present and ready for dispensing.

Thus, specific embodiments of a refrigerator with carbonated drink spout have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A refrigerator with carbonated drink spout comprising:
a refrigerator;
said refrigerator having a user accessible port located on an exterior surface of said refrigerator that is configured whereby a single serving syrup container holding a single serving syrup container is insertable into said user accessible port of a door of said refrigerator and a seal on said single serving syrup container is broken upon said single serving syrup container being inserted;
said user accessible port includes a reader that reads a unique identifier from said single serving syrup container that is activated upon insertion of said single serving syrup;
said activation will turn-on a drink dispensing display for a period of time;
said refrigerator having a dispensing port located in proximity to said user accessible port;
said refrigerator internally blends fluid from said user accessible port with water to create a beverage based upon information from said unique identifier, and
dispensing said beverage out of said dispensing port.

2. The refrigerator with carbonated drink spout according to claim 1, further includes a CO2 tank.

3. The refrigerator with carbonated drink spout according to claim 2, wherein said CO2 tank is replaceable.

4. The refrigerator with carbonated drink spout according to claim 1, further includes at least one internal holding reservoir for fluid that is blended with said syrup.

5. The refrigerator with carbonated drink spout according to claim 4, wherein said at least one internal holding reservoir is flat water.

6. The refrigerator with carbonated drink spout according to claim 4, wherein said at least one internal holding reservoir is carbonated water.

7. The refrigerator with carbonated drink spout according to claim 4, wherein said at least one internal holding reservoir is refrigerated.

8. The refrigerator with carbonated drink spout according to claim 1, wherein said unique identifier is a bar code, a serial number or an RFID.

9. The refrigerator with carbonated drink spout according to claim 1, further includes a communications system.

10. The refrigerator with carbonated drink spout according to claim 9, wherein said communications system is wired or wireless.

11. The refrigerator with carbonated drink spout according to claim 10 wherein said communications handles inventory management.

12. The refrigerator with carbonated drink spout according to claim 9, wherein said communications system communicates an identifier about the container that holds the syrup.

13. The refrigerator with carbonated drink spout according to claim 1, wherein the container that holds the syrup has an identifier regarding a mix ratio of the syrup to the water or to the carbonated water.

14. The refrigerator with carbonated drink spout according to claim 13, wherein said refrigerator further includes a display and at least one button.

15. The refrigerator with carbonated drink spout according to claim 14, wherein said at least one button is configured to allow a user to alter the ratio of the syrup to the water or to the carbonated water.

16. The refrigerator with carbonated drink spout according to claim 1, when insertion of the container is detected the display is illuminated.

17. The refrigerator with carbonated drink spout according to claim 1, further includes a self-clean cavity.

18. The refrigerator with carbonated drink spout according to claim 1, further includes a timeout feature based upon initial insertion of said single serving syrup container.

* * * * *